（12） United States Patent
Takagi

(10) Patent No.: US 8,699,063 B2
(45) Date of Patent: Apr. 15, 2014

(54) INFORMATION PROCESSING APPARATUS, INFORMATION PROCESSING METHOD, AND PROGRAM

(75) Inventor: Yoshihiro Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 490 days.

(21) Appl. No.: 13/005,008

(22) Filed: Jan. 12, 2011

(65) Prior Publication Data

US 2011/0176167 A1    Jul. 21, 2011

(30) Foreign Application Priority Data

Jan. 15, 2010    (JP) .................................. 2010-007423

(51) Int. Cl.
*G06F 3/12* (2006.01)
*G06K 15/00* (2006.01)
*G06F 15/00* (2006.01)
*G06K 1/00* (2006.01)

(52) U.S. Cl.
USPC ....................................................... 358/1.15

(58) Field of Classification Search
None
See application file for complete search history.

(56) References Cited

U.S. PATENT DOCUMENTS

| 2006/0256364 | A1 | 11/2006 | Yamamoto | |
| 2007/0097416 | A1* | 5/2007 | Higashimura et al. | 358/1.15 |
| 2007/0146778 | A1* | 6/2007 | Kitagata et al. | 358/1.15 |
| 2008/0209419 | A1* | 8/2008 | Maeda | 718/100 |
| 2008/0259389 | A1* | 10/2008 | Takahashi | 358/1.15 |
| 2009/0217268 | A1 | 8/2009 | Pandit et al. | |
| 2009/0290193 | A1* | 11/2009 | Ohba et al. | 358/1.15 |
| 2010/0123917 | A1* | 5/2010 | Minagawa | 358/1.9 |
| 2010/0149580 | A1* | 6/2010 | Iizuka | 358/1.14 |
| 2013/0222853 | A1* | 8/2013 | Minagawa | 358/1.16 |

FOREIGN PATENT DOCUMENTS

| CN | 101604368 A | 12/2009 |
| JP | 2008-036999 A | 2/2008 |
| JP | 2008-097226 A | 4/2008 |
| JP | 2008-097226 A | 4/2008 |
| JP | 2008-162206 A | 7/2008 |
| JP | 2009-086976 A | 4/2009 |
| JP | 2009-301383 A | 12/2009 |

* cited by examiner

*Primary Examiner* — Satwant Singh

(74) *Attorney, Agent, or Firm* — Canon USA, Inc., IP Division

(57) ABSTRACT

According to the present invention, a user can properly acquire a desired print product with a few procedures in front of an output device. An information processing apparatus includes a print job output unit configured to output a print job, wherein, if the print job output unit receives a request for pull printing from an output device related apparatus for a first time, the print job output unit compares a capacity of an output target device with a print setting, selects a print job including a print setting matching with the capacity of the output target device from stored print jobs, and outputs the selected print job, and if the print job output unit receives a request for pull printing from the output device related apparatus consecutively, the print job output unit outputs the stored print jobs.

4 Claims, 14 Drawing Sheets

FIG.3

| ID OF IC CARD | NETWORK ADDRESS OF PC |
|---|---|
| 162696509400678657 | 192.168.0.2 |
| 149467185495277825 | 192.168.0.3 |
| ... | ... |

IC CARD (150a)
IC CARD (150b)
PC (110a)
PC (110b)

FIG.4

| NETWORK ADDRESS OF AUTHENTICATION UNIT | NETWORK ADDRESS OF OUTPUT DEVICE |
|---|---|
| 192.168.0.16 | 192.168.0.48 |
| 192.168.0.17 | 192.168.0.49 |
| ... | ... |

AUTHENTICATION UNIT (120a)
AUTHENTICATION UNIT (120b)
OUTPUT DEVICE (130a)
OUTPUT DEVICE (130b)

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program.

2. Description of the Related Art

Conventionally, various methods for implementing measures to protect a print product from theft, loss, peek, and intentional and unintentional abandonment have been discussed. For example, Japanese Patent Application Laid-Open No. 2009-86976 discusses a pull printing method. In the pull printing method, a host personal computer (PC) temporarily suspends execution of a print job, and when an output device transmits a certain signal, the host PC outputs the suspended print jobs. Since the method does not need advanced control on the output device side, an operation of a separate server or the like, the method has an advantage that can be realized at a low cost. Japanese Patent Application Laid-Open No. 2008-97226 discusses a method in which, a host PC acquires output device configuration information when executing pull printing, compares print job setting information with the output device configuration information, and determine whether to execute printing.

According to these conventional methods, pull printing can be implemented even with output devices that do not have advanced functions. However, a user needs to simplify an instruction to output a print job. According to Japanese Patent Application Laid-Open No. 2009-86976, when pull printing is executed, a user has only two choices, the user can only allow the host PC to output a plurality of accumulated print jobs at once or one by one. Further, the output device is determined only when the user gives an instruction to execute pull printing. Thus, the user cannot be sure whether a print setting specified on the host PC is valid until the output device is determined, resulting in an increase of erroneous printing. To prevent erroneous printing, the host PC needs to suspend a print job determined as inappropriate by the method as discussed in Japanese Patent Application Laid-Open No. 2008-97226. However, as described above, when pull printing is executed, a plurality of print jobs is output at once or one by one. In such a limited method, the user cannot always acquire a desired print product.

The above problems will be described based on a more specific example. It is assumed that a plurality of high-speed monochrome multifunction peripherals and a plurality of single function color printers are arranged in an office. When a user inputs a plurality of monochrome-data print jobs and color-data print jobs and uses a color printer to execute pull printing, if the user outputs all the accumulated print jobs, the high-speed monochrome multifunction peripheral cannot be effectively utilized. Normally, the user may wish to use the high-speed monochrome multifunction peripheral to output the monochrome-data print jobs and the single function color printer to output the color-data print jobs.

When the user uses the high-speed monochrome multifunction peripheral to execute pull printing, there are two output cases. In one case, the monochrome multifunction peripheral outputs the color-data print jobs in monochrome. In the other case, although the print jobs are color data, since the output device is not compliant with color printing, the PC determines not output the print jobs of color data. Thus, the monochrome multifunction peripheral does not output anything. Before inputting a print job, the user needs to determine whether he/she gives priority to execution of printing (the user allows monochrome printing of the color-data print job) or to color quality (the user does not allow monochrome printing of the color-data print job) on the host PC. Although the user uses a system in which he/she can decide the output device after inputting a print job, the user needs to determine detailed operations of the system at an early stage. Therefore, usability of the system is very poor.

When outputting a plurality of accumulated print jobs one by one, the user goes to an output device installation location to give an instruction for pull printing for each print job. Seemingly, the above problems are solved. However, under such circumstance, the user needs to understand settings and sequence of the input print jobs before going to the output device installation location. If the user inputs many print jobs, it is difficult to do such task.

SUMMARY OF THE INVENTION

The present invention relates to a technique that enables a user to properly obtain a desired print product with a few procedures in front of an output device.

According to an aspect of the present invention, an information processing apparatus includes a print job output unit configured to output a print job, wherein, if the print job output unit receives a request for pull printing from an output device related apparatus for a first time, the print job output unit compares a capacity of an output target device with a print setting, selects a print job including a print setting matching with the capacity of the output target device from stored print jobs, and outputs the selected print job, and wherein, if the print job output unit receives a request for pull printing from the output device related apparatus consecutively, the print job output unit outputs the stored print jobs.

According to the present invention, a user can properly obtain a desired print product with a few procedures in front of the output device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a table illustrating information about combinations of identification (ID) of an integrated-circuit (IC) card and a network address of a PC stored in an authentication server.

FIG. 4 is a table illustrating information about combinations of a network address of an authentication unit and a network address of an output device stored in the authentication server.

DESCRIPTION OF THE EMBODIMENTS

Various exemplary embodiments, features, and aspects of the invention will be described in detail below with reference to the drawings.

Figure 1:
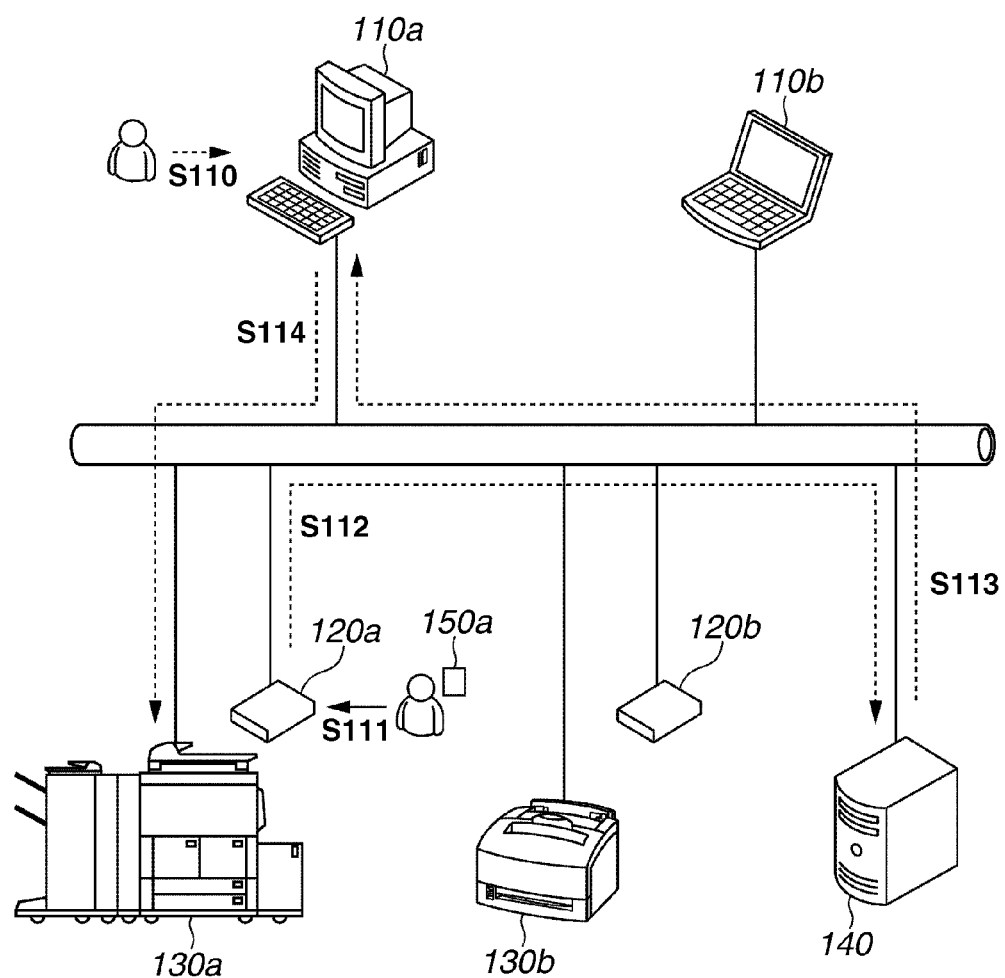
FIG. 1 illustrates a schematic configuration of a network system.

FIG. 1 illustrates a schematic configuration of a network system including a plurality of personal computers (PCs), a plurality of authentication units, and a plurality of output devices each controlled by an authentication server. As illustrated in FIG. 1, the network system includes a plurality of PCs (110a and 110b), a plurality of authentication units (120a and 120b), a plurality of output devices (130a and 130b) each having a print function, an authentication server 140, an IC card 150a, and the like. The authentication units and the authentication server are examples of an output device related apparatus.

Before detailed description of each unit included in the system, the outline of a system operation will be described. First, in step S110, a user gives a printing instruction to the PC 110a, and the PC 110a executes print processing without specifying an output device and stores the input print job. Next, in step S111, the user holds the IC card 150a over the authentication unit 120a, and the authentication unit 120a receives a signal indicating selection of the output device 130a. In step S112, the authentication unit 120a reads the IC card 150a to obtain an ID unique thereto and transmits the ID to the authentication server 140. In step S113, the authentication server 140 transmits a network address of the output device 130a to the PC 110a associated with the received ID. The PC 110a renders the print job stored therein and outputs the rendered data to the received network address of the output device 130a.

Hereinafter, each of the units included in the system in FIG. 1 will be sequentially described in detail, supplementing the outline of the system operation.

[Authentication Unit 120]

The authentication unit 120 is a terminal identifying an output device and executing secure pull printing. The authentication unit needs to be arranged with an output device in pairs. For example, in FIG. 1, the output device 130a is associated with the authentication unit 120a, and the output device 130b is associated with the authentication unit 120b. While each of the authentication units can associate itself with an output device, in the present exemplary embodiment, the authentication server 140 associates each authentication unit with an output device.

Figure 2:
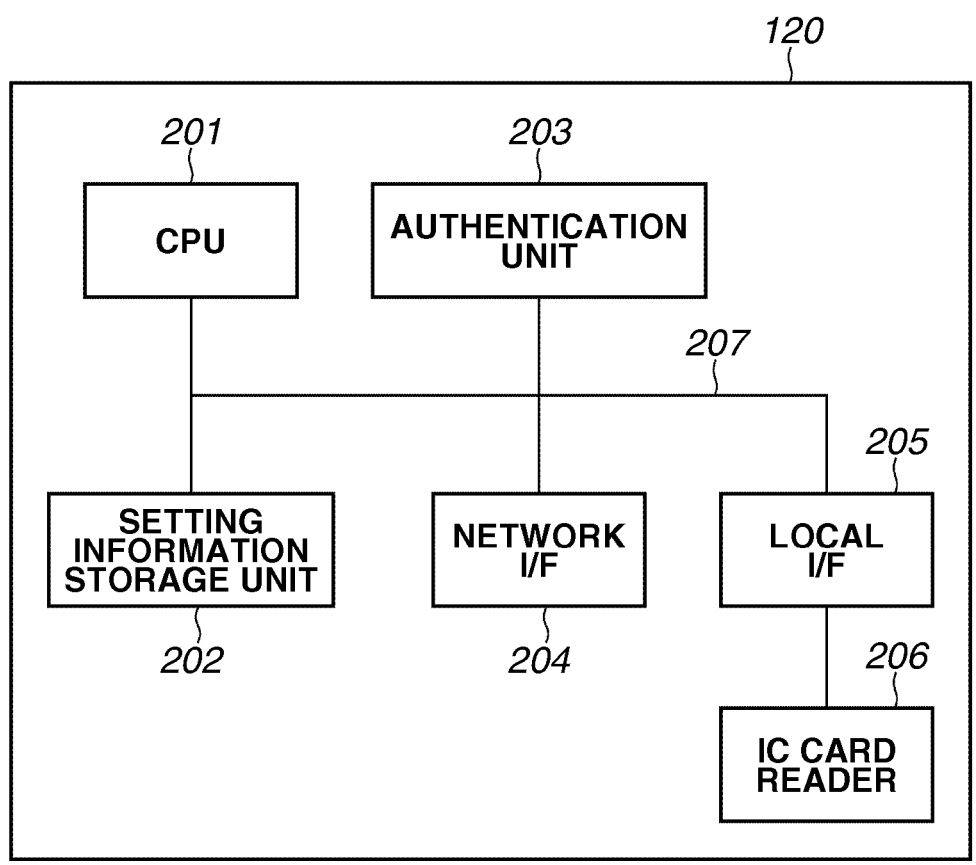
FIG. 2 illustrates a schematic hardware configuration of an authentication unit.

FIG. 2 illustrates a schematic hardware configuration of the authentication unit 120. As illustrated in FIG. 2, the authentication unit 120 includes a central processing unit (CPU) 201, a setting information storage unit 202, an authenticating unit 203, a network interface (I/F) 204, and a local I/F 205. The authentication unit 120 includes these functional units connected to each other via a system bus 207. In addition, the authentication unit 120 includes an IC card reader 206 connected to the local I/F 205. The CPU 201 controls the overall operation of the authentication unit 120. The setting information storage unit 202 stores an network address of the authentication server 140 which is input when the authentication unit 120 is initially set.

The IC card reader 206 reads an IC card to obtain identification information unique thereto. The present exemplary embodiment assumes a reader compliant with a non-contact IC card, such as Felica (registered trademark) or the like, as the IC card reader 206. However, the present invention is not limited to this technique. As long as unique identification information can be input, other methods may be used. For example, instead of an IC card reader, a biometric authentication sensor such as a fingerprint sensor may be used. Since the IC card reader 206 is connected to the system bus 207 not directly but via the local I/F 205, the user can flexibly change the ID acquisition method. The authenticating unit 203 acquires an ID via the IC card reader 206 and transmits the ID to the authentication server 140 via the network I/F 204.

[IC Card 150]

The IC card 150 can be regarded as a device for storing identification information unique thereto and is used to identify the PC that has instructed to execute print processing. While the authentication unit 120 can associate the IC card with the PC, in the present exemplary embodiment, the authentication server 140 is used for the association. As described above, a non-contact IC card, such as Felica or the like, is used as the IC card 150 in the present exemplary embodiment, the present invention is not limited to such technique. Biological information such as a fingerprint can be used to supply the unique identification information.

[Output Device 130]

The output device 130 may be a multifunction peripheral (MFP) or a single function printer (SFP) having a print function. Since the authentication unit 120 is arranged to identify the output device 130, normally, the authentication unit 120 and the output device 130 are arranged physically close to each other. In the present exemplary embodiment, the authentication unit 120 and the output device 130 are provided as separate devices. However, the system may include an output device having a function of the authentication unit.

[Authentication Server 140]

The authentication server 140 stores information about combination of ID of the IC card and the network address of the PC as illustrated in a table in FIG. 3. In addition, the authentication server 140 stores information about combinations of the network address of the authentication unit and the network address of the output device as illustrated in a table in FIG. 4. The authentication server 140 integrally manages pieces of the information in FIGS. 3 and 4 to facilitate management of the pull printing system.

For example, first, the authentication server 140 receives the ID (162696509400678657) of the IC card 150a from the authentication unit 120a. Next, the authentication server 140 acquires the network address (192.168.0.2) of the PC associated with the ID of the IC card 150*a* from the information in FIG. 3. Further, the authentication server 140 acquires the network address (192.168.0.48) of the output device associated with the network address (192.168.0.16) of the authentication unit 120*a* from the information in FIG. 4. Then, the authentication server 140 transmits the network address (192.168.0.48) of the output device to the network address (192.168.0.2) of the PC as data. The network address (192.168.0.2) indicates the PC 110*a* and the network address (192.168.0.48) indicates the output device 130*a*. The authentication server 140 does not need to exist in the same office where the PC 110*a* or the output device 130*a* exists. The functions of the authentication server 140 may be realized through a cloud computing service.

[PC 110]

Figure 5:
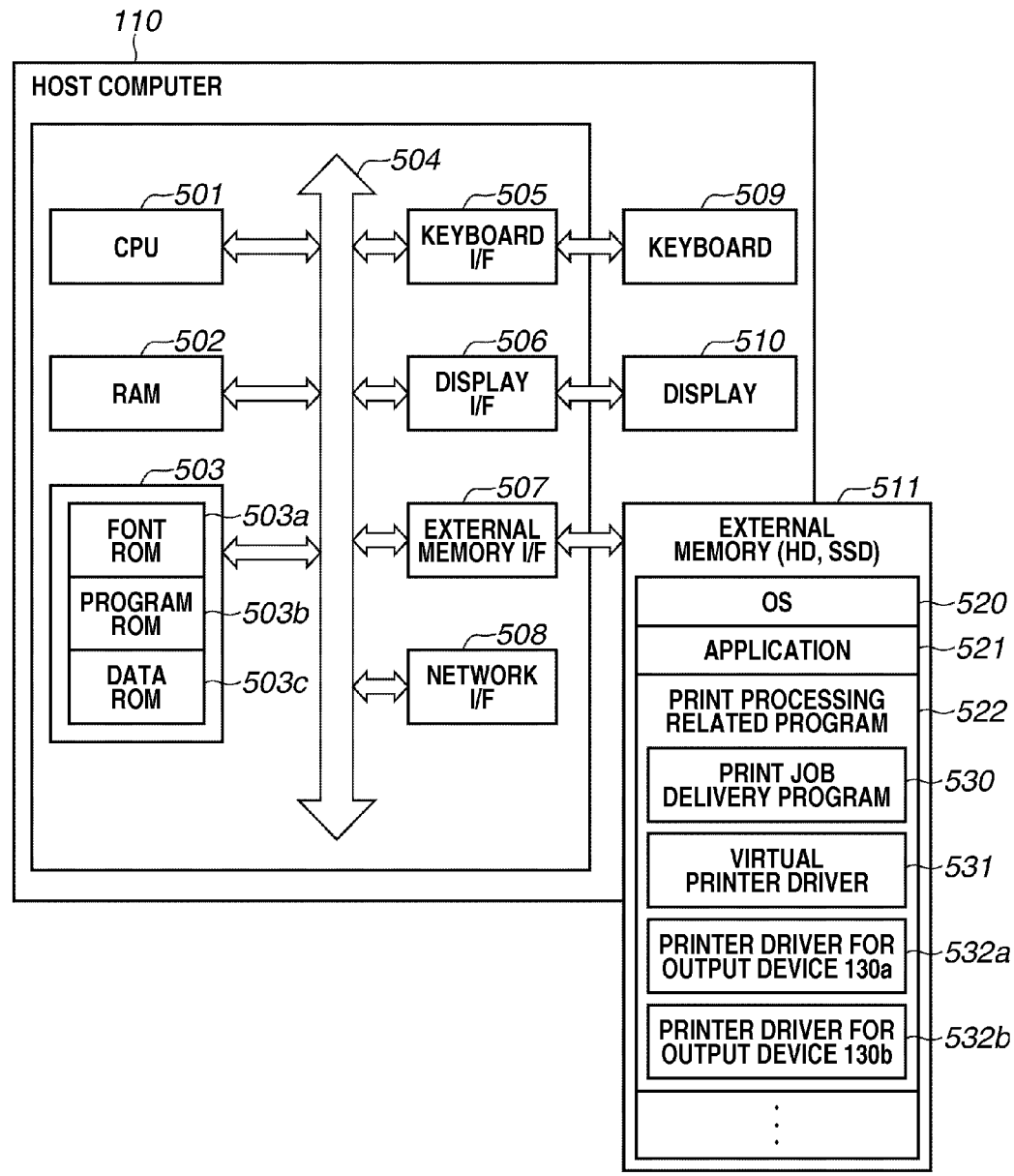
FIG. 5 illustrates a schematic hardware configuration of a PC.

The PC 110 is the most important apparatus in the pull printing system according to the present exemplary embodiment. FIG. 5 is a block diagram illustrating a configuration of the PC 100. The PC 110 includes a CPU 501 comprehensively controlling each of the units connected to a system bus 504 based on programs stored in a RAM 502. Functions of the PC 110 are realized by the CPU 501 executing processing based on programs. However, for simplicity, the following description may include portions that suggest that a program executes processing. The RAM 502 also functions as a main memory and a work area of the CPU 501. A read-only memory (ROM) 503 stores various programs and pieces of data. The ROM 503 includes a font ROM 503*a* storing various fonts, a program ROM 503*b* storing a boot program, a basic input/output system (BIOS), and the like, and a data ROM 503*c* storing various pieces of data.

A keyboard controller I/F 505 controls key input from a keyboard 509 or a pointing device such as a mouse (not illustrated). A display I/F 506 controls display on a display 510. An external memory I/F 507 controls access to an external memory 511 such as a hard disk (HD). A printer I/F 508 is connected to the output device 130 via a network I/F 508 to control communication with the output device 130. Examples of the external memory 511 include a HD, a solid state disk (SSD), a magnetooptic (MO) disk, and a flexible disk.

As illustrated in FIG. 5, the external memory 511 stores an operating system program (OS) 520. In addition to an application 521 of various types (a document processing application program, for example) and a print processing related program 522, the external memory 511 stores a user file, an edit file, and the like.

The print processing related program 522 generates print data described in page description language (PDL), and a plurality of printers in the same system can share the print processing related program 522. In addition, the print processing related program 522 includes a print job delivery program 530, a printer control command generation module (printer driver) 532, and a virtual printer driver 531 which are examples of a print job output unit according to the present exemplary embodiment. The RAM 502 loads the application 521 stored in the external memory 511, and the CPU 501 executes the application 521.

The CPU 501 executes outline font rasterization on the RAM 502 to enable a "what you see is what you get" (WYSIWYG) function on the display 510. Further, based on a command entered using a mouse cursor (not illustrated) on the display 510, the CPU 501 opens various registered windows and executes various types of data processing. When executing printing, the user can open a print setting screen controlled by the virtual printer driver 531 to set a printer and select a print mode.

Figure 6:
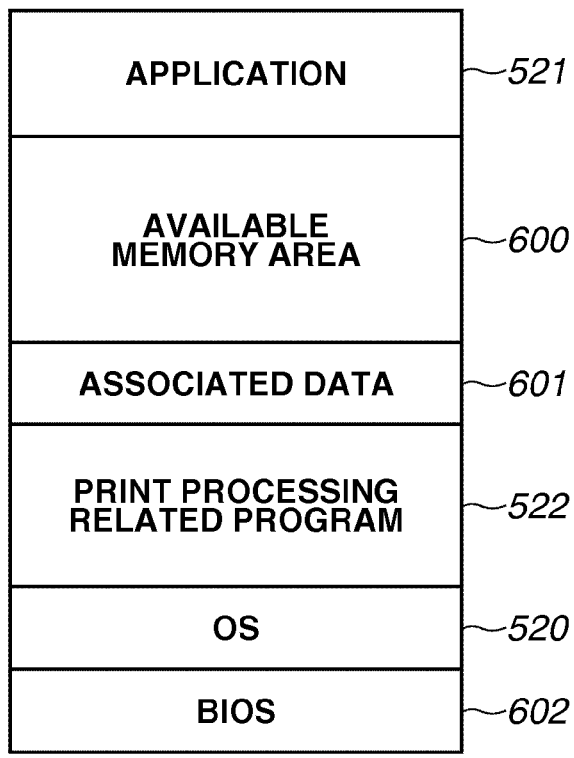
FIG. 6 illustrates a memory map of a random access memory (RAM) when an application and a print processing related program are activated and programs and data are loaded in the RAM of the PC.

FIG. 6 illustrates a memory map of the RAM 502 when a predetermined application and the print processing related program 522 are activated and programs and data are loaded in the RAM 502 of the PC 110. As illustrated in FIG. 6, a BIOS 602, the OS 520, the application 521, the print processing related program 522, and associated data 601 are loaded in the RAM 502. In addition, an available memory area 600 is secured in the RAM 502. In this way, the CPU 501 can execute the application 521 and the print processing related program 522. According to a print setting command input by a user, the virtual printer driver 531 in FIG. 5 in the print processing related program 522 displays a print setting UI as illustrated in FIG. 7 and executes print processing.

Figure 7:
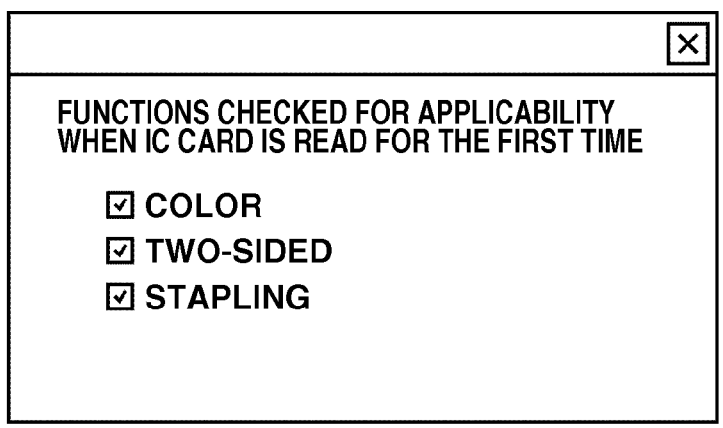
FIG. 7 illustrates a part of a user interface (UI) displayed by a virtual printer driver when the PC receives an instruction to display a print setting UI from a user.

FIG. 7 illustrates a part of a UI displayed by the virtual printer driver 531 when the PC 110 receives an instruction to display the print setting UI from the user. The UI is used to determine in advance setting contents to be referred by the print job delivery program 530 when the user holds the IC card 150 over the authentication unit 120 for the first time. The set contents will be described below with reference to FIG. 9.

Figure 8:
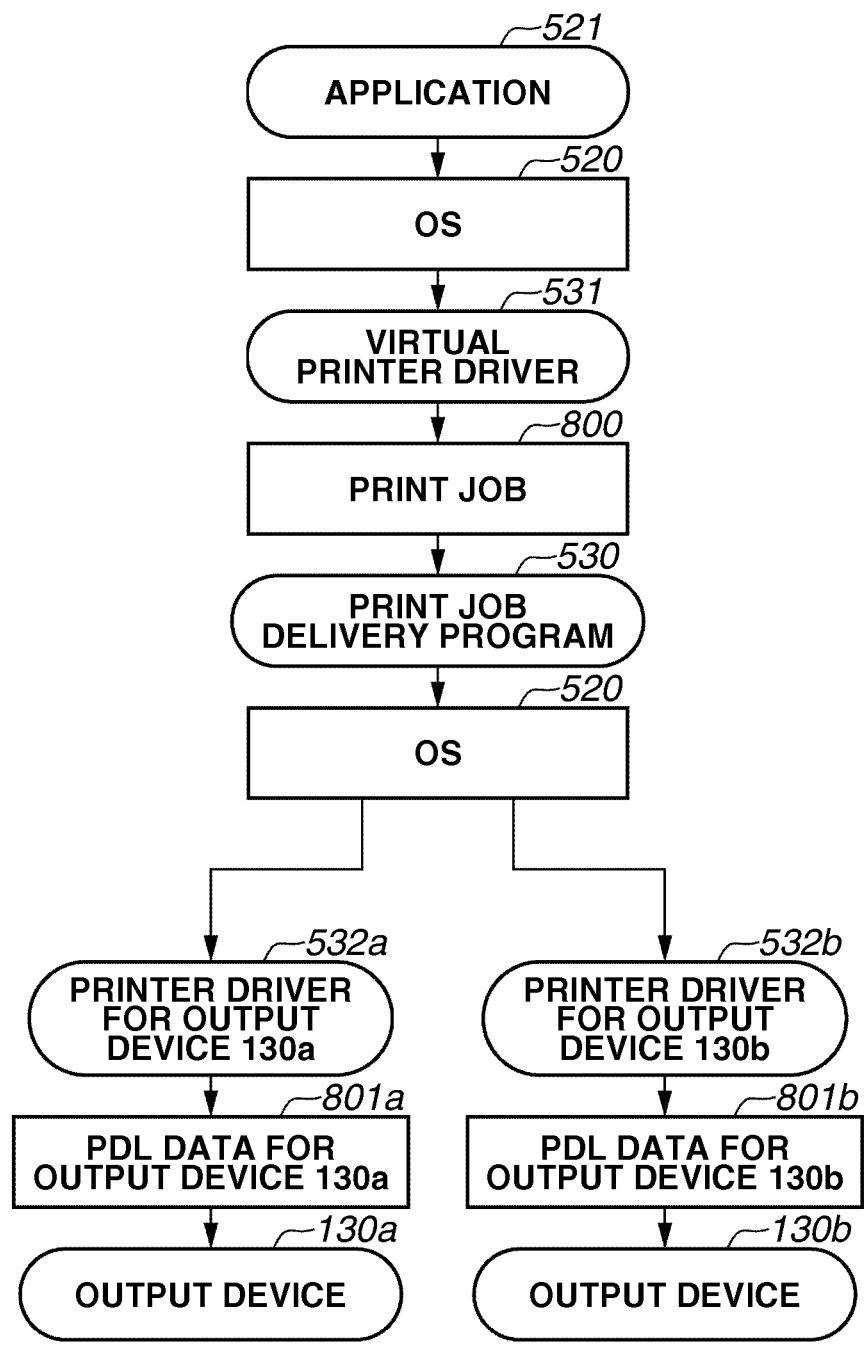
FIG. 8 illustrates a data flow during print processing in the PC.

FIG. 8 illustrates a data flow during print processing in the PC 110. According to an operation by the user, the application 521 selects a print queue of the virtual printer driver 531 as an output destination and executes printing. Selection of the virtual printer driver 531 by the application 521 when printing is executed means that an output device has not been determined yet at this stage. The application 521 transmits print setting data and print rendering data to the virtual printer driver 531 via an interface of the OS 520. The virtual printer driver 531 transmits a print job 800 to the print job delivery program 530 and ends print processing. The print job delivery program 530 receives the print job 800 and is brought in a standby state. Upon receiving a signal from the authentication server 140, the print job delivery program 530 uses an OS function to select a printer driver associated with the network address of the output device. Then, the print job delivery program 530 inputs the print job 800 again to the selected printer driver via the interface of the OS 520.

If the print job delivery program 530 selects a printer driver 532*a*, the printer driver 532*a* renders the input print job and generates a PDL 801*a* for the output device 130*a*. Then, the printer driver 532*a* transmits the PDL 801*a* to the output device 130*a*. On the other hand, if the print job delivery program 530 selects a printer driver 532*b*, the printer driver 532*b* renders the input print job and generates a PDL 801*b* for the output device 130*b*. Then, the printer driver 532*b* transmits the PDL 801*b* to the output device 130*b*.

Figure 9:
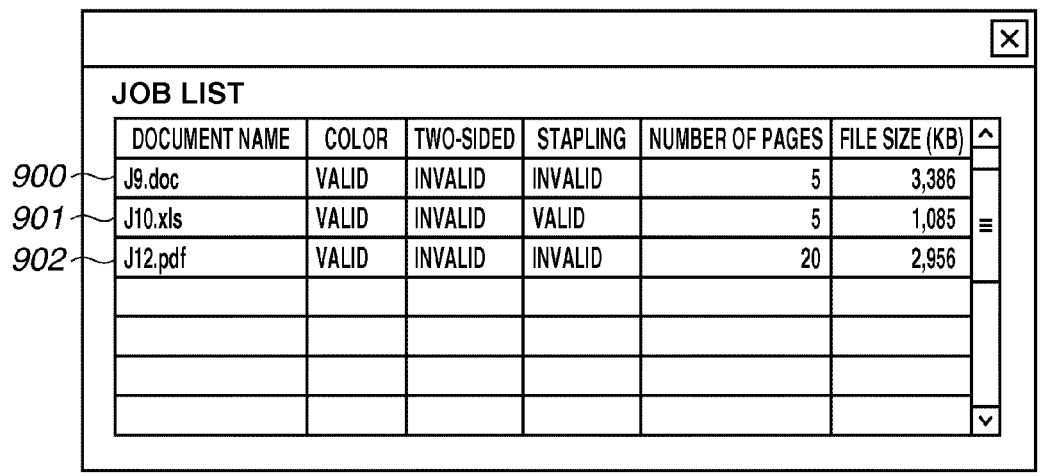
FIG. 9 illustrates a UI displayed on a screen of the PC while a print job delivery program waits for a signal from the authentication server.

FIG. 9 is a UI displayed on a screen of the PC 110 while the print job delivery program 530 waits for a signal from the authentication server 140. The UI displays a list of print jobs 800 received from the virtual printer driver 531. While the print job delivery program 530 waits for a signal from the authentication server, the application 521 can execute printing a plurality of times. The print job delivery program 530 can store a plurality of print jobs. The list displayed in the UI in FIG. 9 includes three print jobs (900 to 902).

Figure 10:
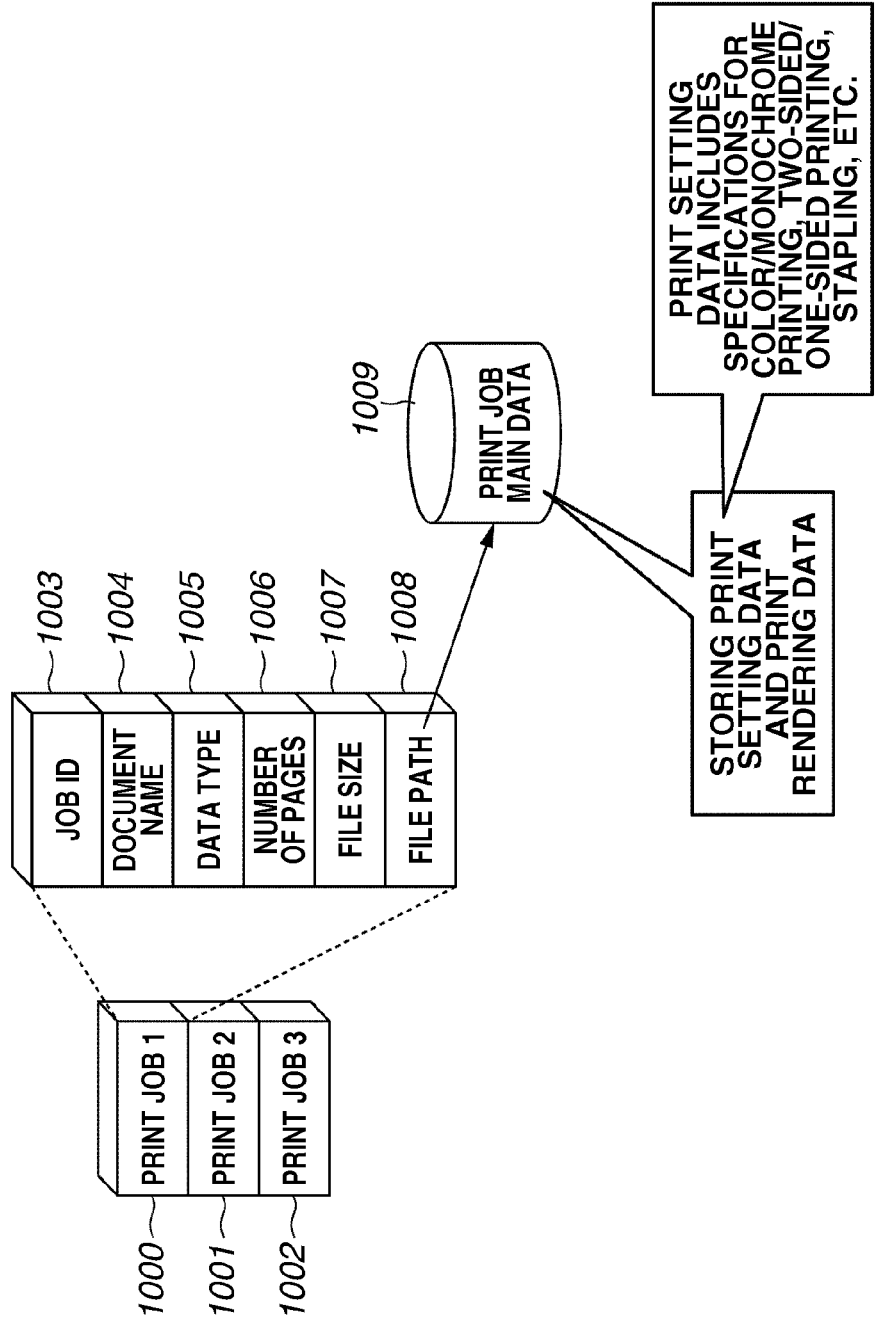
FIG. 10 illustrates a memory map of the RAM when a plurality of print jobs in FIG. 9 is loaded in the RAM of the PC.

FIG. 10 illustrates a memory map of the RAM 502 when the plurality of print jobs in FIG. 9 is loaded in the RAM 502 of the PC 110. Memories 1000 to 1002 correspond to the print jobs displayed in rows 900 to 902 in FIG. 9, respectively. The memory stores these memories 1000 to 1002 as an array. Such array of print jobs will be hereinafter referred to as a job list.

Each of the data (print jobs) includes components 1003 to 1008. An ID 1003 identifies the print job. A document name 1004 of a print job is displayed on the screen in FIG. 9. A data type 1005 is a data type of a print job main data 1009, which will be described below. More specifically, the data type 1005 indicates whether the print job main data 1009 is in extensible markup language (XML) paper specification (XPS), portable document format (PDF), or enhanced meta file (EMF). Further, each print job includes the number of pages 1006 thereof, and the number of pages 1006 is displayed on the screen in FIG. 9. A print job data size 1007 (that is a file size of the print job main data 1009) is displayed on the screen in FIG. 9.

Each print job includes a file path 1008 for specifying the print job main data 1009. The print job main data 1009 is a file storing print setting data and print rendering data. The print settings stored in the file include specifications for color/monochrome printing, two-sided/one-sided printing, stapling, and the like. These settings are displayed on the screen in FIG. 9. While the print job main data 1009 normally exists in the external memory 511, if the file size 1007 is sufficiently smaller than a total capacity of the RAM 502, the print job main data 1009 may be loaded in the RAM 502.

Figure 11:
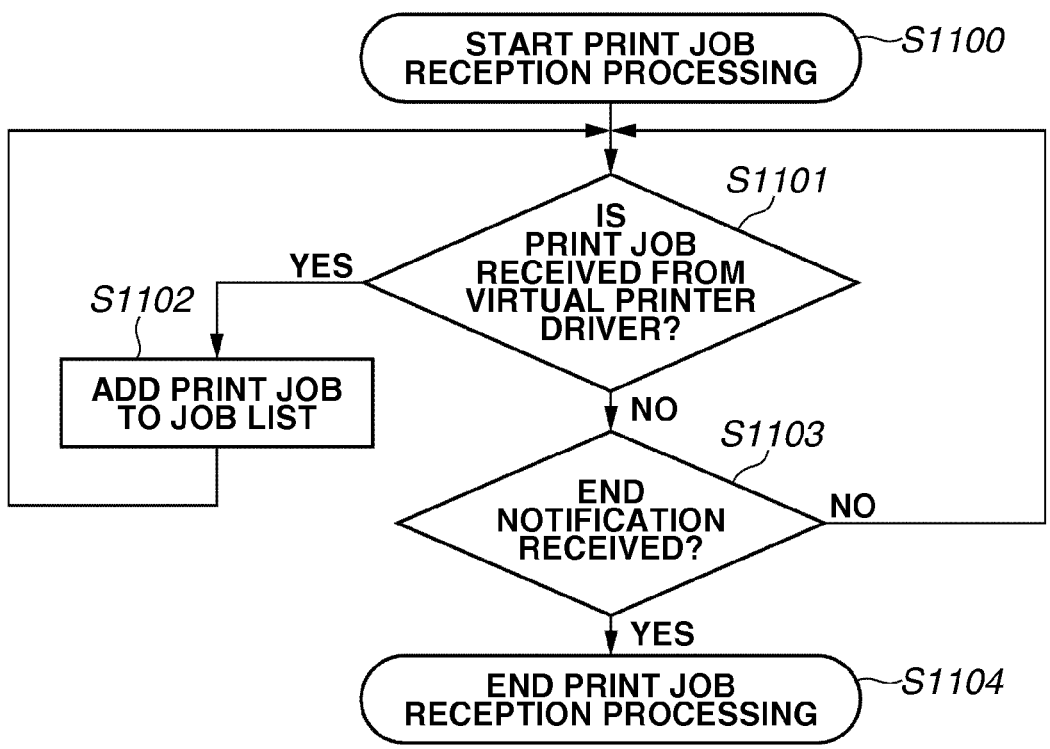
FIG. 11 is a flow chart illustrating print job reception processing executed by the print job delivery program.

FIG. 11 is a flow chart illustrating print job reception processing executed by the print job delivery program 530. First, in step S1100, the print job delivery program 530 activates a thread and starts the print job reception processing. In step S1101, the print job delivery program 530 determines whether a print job is received from the virtual printer driver 531. If the print job delivery program 530 has received a print job (YES in step S1101), then in step S1102, the print job delivery program 530 adds the received print job to the job list in FIG. 10. The print job delivery program 530 updates the job list and the UI in FIG. 9 at the same time. Then, the print job delivery program 530 returns the processing to step S1101.

If it is not determined that a print job is received (NO in step S1101), then in step S1103, the print job delivery program 530 determines whether an end notification is received. An issuing source of the end notification will be described below with reference to FIG. 12. If the print job delivery program 530 has not received the end notification (NO in step S1103), the print job delivery program 530 returns the processing to step S1101. If the print job delivery program 530 has received the end notification (YES in step S1103), then in step S1104, the print job delivery program 530 ends the print job reception processing.

Figure 12:
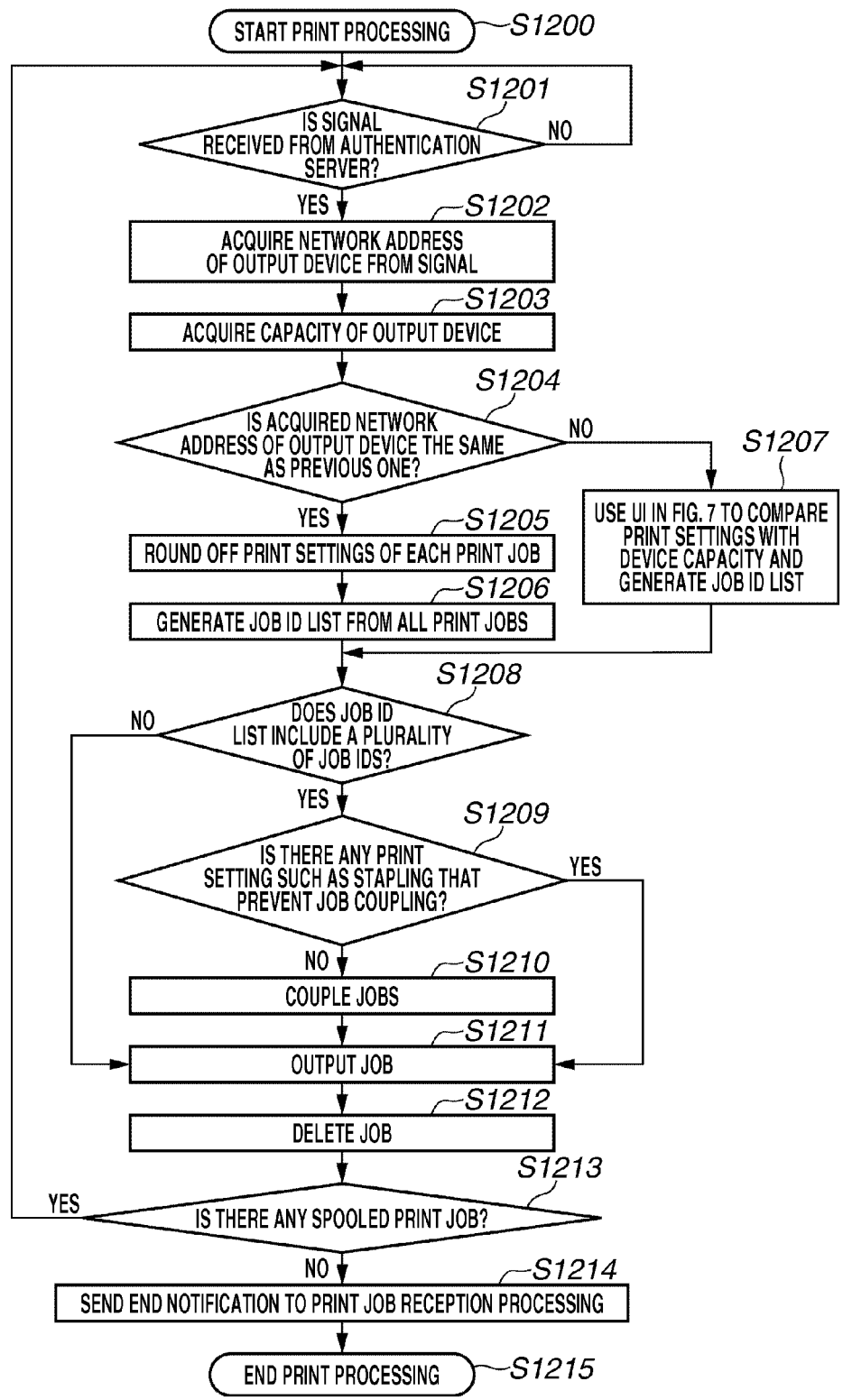
FIG. 12 is a flow chart illustrating information processing executed by the print job delivery program that is unique to an exemplary embodiment of the present invention.

FIG. 12 is a flow chart illustrating information processing executed by the print job delivery program that is unique to the present exemplary embodiment. The processing operates on a different thread from that of the print job reception processing in FIG. 11. In step S1200, when the first print job is added to the job list, the print job delivery program 530 starts the processing. In step S1201, the print job delivery program 530 determines whether a signal which is an example of a request for pull printing is received from the authentication server 140. If the print job delivery program 530 has received a signal (YES in step S1201), in step S1202, the print job delivery program 530 acquires a network address of the output device from the signal. If not (NO in step S1201), the print job delivery program 530 returns the processing to step S1201.

In step S1203, the print job delivery program 530 uses the network address of the output device and performs bidirectional communication with the output device to acquire a capacity of the output device. The capacity refers to presence or absence of functions such as for color printing, two-sided printing, and stapling. In step S1204, the print job delivery program 530 determines whether the network address acquired in step S1202 is the same as the output device network address included in a previously acquired signal. More specifically, in step S1204, the print job delivery program 530 determines whether the IC card has been read by the same authentication unit two consecutive times. If the print job delivery program 530 determines that the IC card has been read by the same authentication unit two consecutive times (YES in step S1204), then in step S1205, the print job delivery program 530 compares print settings of all the print jobs included in the job list in FIG. 10 with the capacity of the output device, to round off the print settings.

Figure 13:
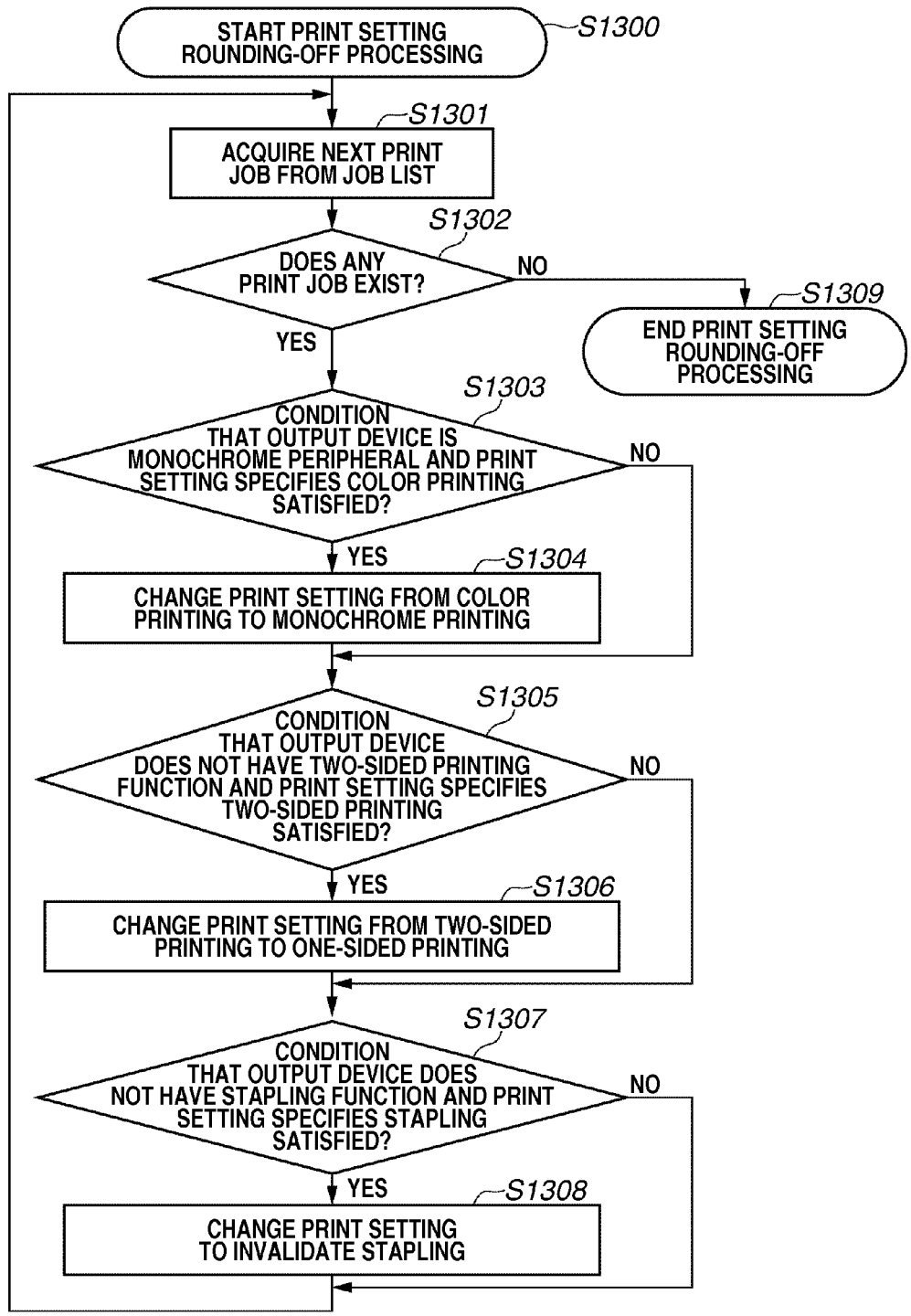
FIG. 13 is a flow chart illustrating print setting rounding-off processing.

FIG. 13 illustrates the rounding-off processing in step S1205 in detail. In step S1300, the print job delivery program 530 starts the rounding-off processing. In steps S1301 and S1302, the print job delivery program 530 examines the print jobs in the job list one by one. In step S1303, it is determined that the output device is the monochrome peripheral and the print setting specifies color printing (YES in step S1303), in step S1304, the print job delivery program 530 changes the print setting from color printing to monochrome printing. In step S1305, if it is determined that the output device does not have a two-sided printing function and the print setting specifies two-sided printing (YES in step S1305), in step S1306, the print job delivery program 530 changes the print setting from two-sided printing to one-sided printing.

In step S1307, if it is determined that the output device does not have a stapling function and the print setting specifies stapling (YES in step S1307), then in step S1308, the print job delivery program 530 changes the print setting to invalidate stapling. If the print job delivery program 530 has examined all the print jobs in the job list, the print job delivery program 530 advances the processing to step S1309 and ends the rounding-off processing. The above rounding-off processing can eliminate an error or a warning message which tends to occur when the output device cannot execute a designated function. In addition, since the PC 110 can avoid transmitting PDL data including color data to the monochrome output device, unnecessary decrease in throughput can be prevented.

Figure 14:
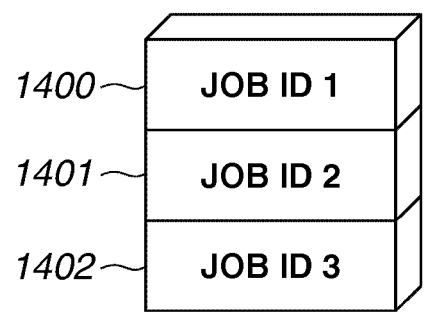
FIG. 14 illustrates a memory map of the RAM when a job ID list generated in step S1206 or S1207 in FIG. 12 is loaded in the RAM of the PC.

Referring back to FIG. 12, in step S1206, the print job delivery program 530 uses all the print jobs included in the job list to generate a job ID list as illustrated in FIG. 14. FIG. 14 illustrates a memory map of the RAM 502 when the job ID list is loaded therein. The memory stores each of the job IDs (1400 to 1402) as an array. The job ID list is a list of print jobs to be output to the output device. In step S1204, if the print job delivery program 530 determines that the IC card is held over a different authentication unit from the previous one or that the IC card is held over the authentication unit for the first time (NO in step S1204), the processing proceeds to step S1207. In step S1207, the print job delivery program 530 uses the UI in FIG. 7 and compares the print setting with the device capacity. More specifically, in step S1207, the print job delivery program 530 generates a job ID list of the print jobs which have the print setting matching with the device capacity from among the stored print jobs.

Figure 15:
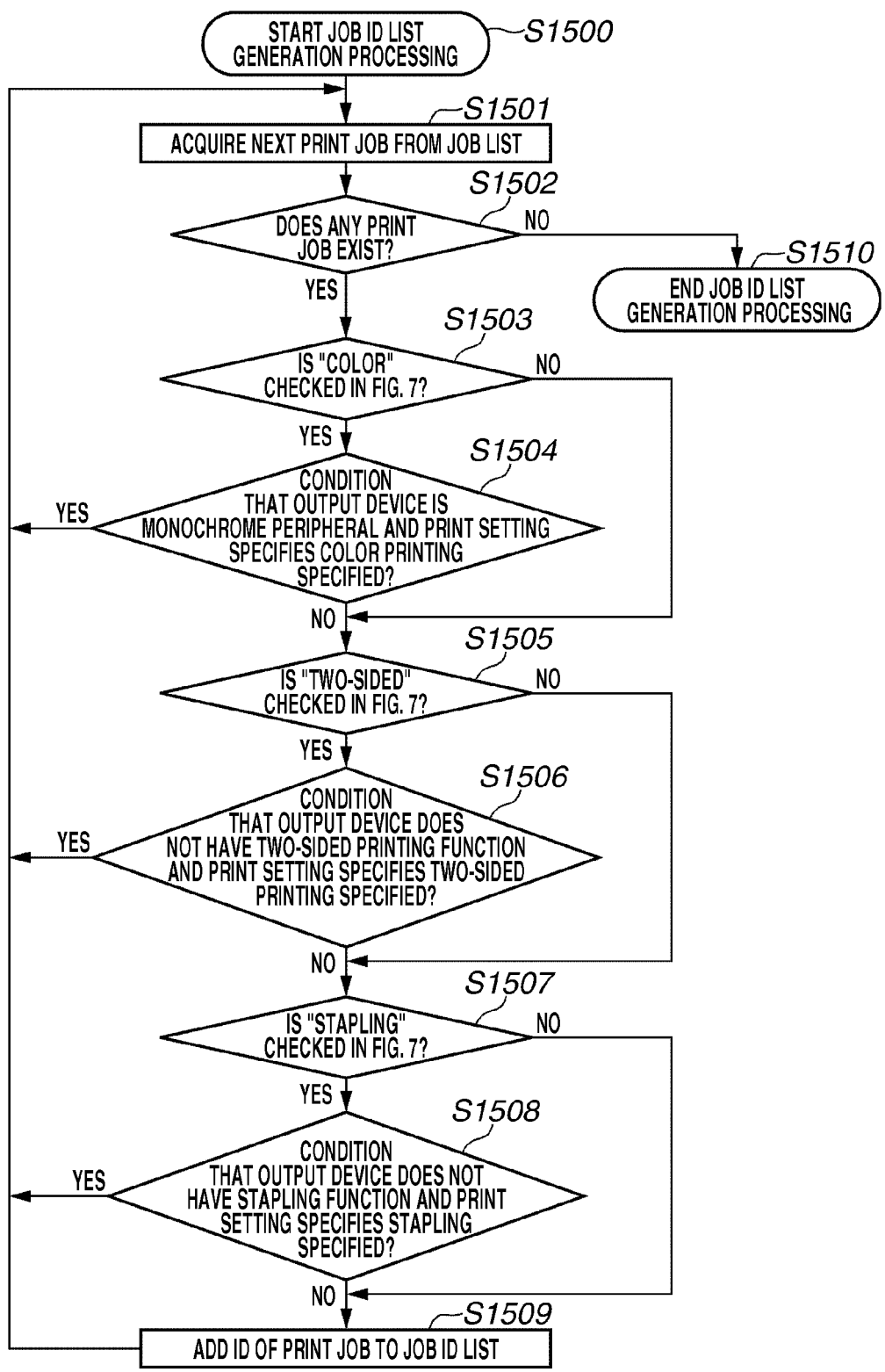
FIG. 15 is a flow chart illustrating job ID list generation processing.

FIG. 15 illustrates the processing for generating the job ID list in step S1207 in detail. In step S1500, the print job delivery program 530 starts the job ID list generation processing. In steps S1501 and S1502, the print job delivery program 530 examines the print jobs in the job list one by one. In step S1503, the print job delivery program 530 determines whether "color" is checked in FIG. 7. If "color" is checked (YES in step S1503), the print job delivery program 530 advances the processing to step S1504. If not (NO in step S1503), the print job delivery program 530 skips the processing in step S1504. In step S1504, it is determined that the output device is the monochrome peripheral and the print setting specifies color printing (YES in step S1504), the print job delivery program 530 skips the processing in step S1509 and advances the processing to step S1501 to execute the next loop processing. Otherwise (NO in step S1504), the print job delivery program 530 advances the processing to step S1505.

In step S1505, the print job delivery program 530 determines whether "two-sided printing" is checked in FIG. 7. If two-sided printing is checked (YES in step S1505), the print job delivery program 530 advances the processing to step S1506. If not (NO in step S1505), the print job delivery program 530 skips the processing in step S1506. In step S1506, if it is determined that the output device does not have the two-sided printing function and the print setting specifies two-sided printing (YES in step S1506), the print job delivery program 530 advances the processing to step S1501 to execute the next loop processing. Otherwise (NO in step S1506), the print job delivery program 530 advances the processing to step S1507.

In step S1507, the print job delivery program 530 determines whether "stapling" is checked in FIG. 7. If "stapling" is checked (YES in step S1507), the print job delivery program 530 advances the processing to step S1508. If not (NO in step S1507), the print job delivery program 530 skips the processing in step S1508. In step S1508, if it is determined that the output device does not have the stapling function and the print setting specifies stapling (YES in step S1508), the print job delivery program 530 skips the processing in step S1509 and advances the processing to step S1501 to execute the next loop processing. Otherwise (NO in step S1508), the print job delivery program 530 advances the processing to step S1509. In S1509, the print job delivery program 530 adds the ID of the print job that is currently processed to the job ID list in FIG. 14.

Then, the print job delivery program 530 advances the processing to step S1501 to execute the next loop processing. In step S1502, if the print job delivery program 530 has examined all the print jobs in the job list (NO in step S1520), then in step S1510, the print job delivery program 530 ends the job ID list generation processing.

According to the execution of processing in step S1206 or S1207 based on the determination in step S1204, if the user holds the IC card over the authentication unit for the first time, the user can obtain a print product in accordance with print settings. In other words, when the output device does not have a capacity suitable for the print setting, the user simply needs to hold the IC card over another authentication unit. If the user is flexible in accurately following the print settings and only needs to obtain a print product, the user simply needs to hold the IC card over the same authentication unit continuously. In this way, the user can properly obtain a desired print product with a few procedures in front of the output device.

As described above, the print job delivery program 530 generates the job ID list including the print jobs to be output. Next, in step S1208, the print job delivery program 530 determines whether the job ID list includes a plurality of job IDs. If the job ID list includes a plurality of job IDs (YES in step S1208), then in step S1209, the print job delivery program 530 determines whether each of the print jobs includes any print setting that hinders job coupling.

Figure 16:
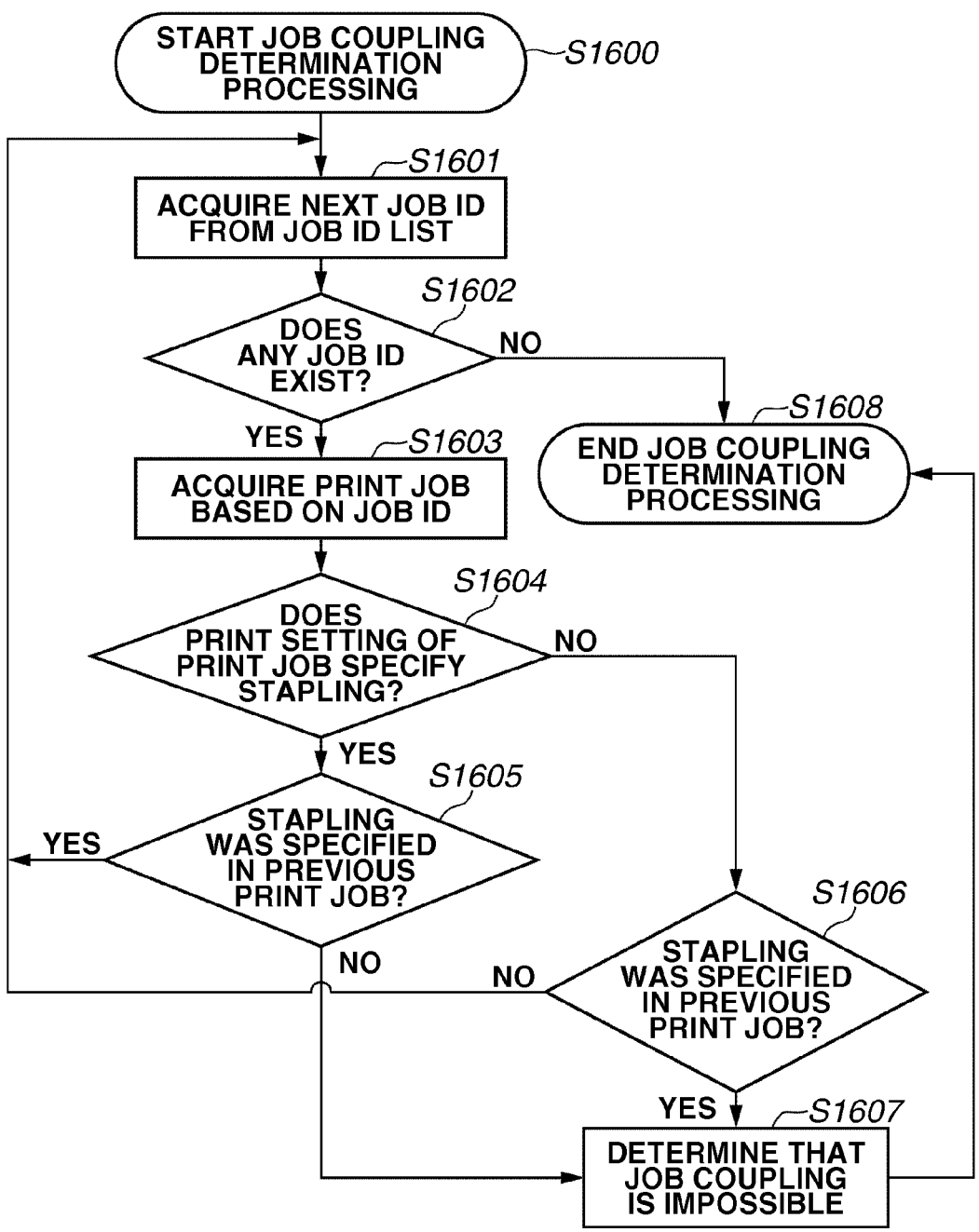
FIG. 16 is a flow chart illustrating job coupling determination processing.

FIG. 16 illustrates the processing for determining the job coupling in step S1209 in detail. In step S1600, the print job delivery program 530 starts job coupling determination processing. In steps S1601 and S1602, the print job delivery program 530 examines the job IDs in the job ID list one by one. In step S1603, the print job delivery program 530 compares the job ID acquired in step S1601 with the job IDs of the print jobs in the job list in FIG. 10 to acquire the print job having identical job ID. In step S1604, the print job delivery program 530 determines whether the print setting of the print job acquired in S1603 specifies stapling.

If stapling is specified (YES in step S1604), in step S1605, the print job delivery program 530 determines whether stapling was specified in the previous loop processing. If stapling was specified in the previous loop processing (YES in step S1605), the print job delivery program 530 advances the processing to step S1601 to execute the next loop processing. If stapling was not specified in the previous loop processing (NO in step S1605), in step S1607, the print job delivery program 530 determines that jobs cannot be coupled together. Then, in step S1608, the print job delivery program 530 ends the job coupling determination processing.

In step S1604, if stapling is not specified (NO in step S1604), in step S1606, the print job delivery program 530 determines whether stapling was specified in the previous loop processing. If stapling was not specified in the previous loop processing (NO in step S1606), the print job delivery program 530 advances the processing to step S1601 to execute the next loop processing. If stapling was specified in the previous loop processing (YES in step S1606), in step S1607, the print job delivery program 530 determines that jobs cannot be coupled together. Then, in step S1608, the print job delivery program 530 ends the job coupling determination processing.

In the flow chart in FIG. 16, the job coupling determination processing has been described by using stapling as an example. However, there is another print setting such as punching that hinders job coupling. Thus, the job coupling determination processing may include such print setting.

Referring back to FIG. 12, in step S1209, if it is determined that jobs can be coupled together as a result of the job coupling determination processing (NO in step S1209), in step S1210, the print job delivery program 530 executes job coupling to create a single print job. In step S1211, the print job delivery program 530 outputs the coupled print job to the output device. In step S1209, if it is determined that jobs cannot be coupled together as a result of the job coupling determination processing (YES in step S1209), the print job delivery program 530 skips the processing in step S1210. Then, in step S1211, the print job delivery program 530 outputs the print jobs related to the job ID list to the output device one by one. According to the processing in steps S1210 and S1211, when a plurality of print jobs is printed, the print jobs can be prevented from being interrupted by another printed product.

In step S1212, the print job delivery program 530 deletes print job that has been output to the output device from the job list. In step S1213, the print job delivery program 530 determines whether the job list still includes any print job. If any print job remains in the job list (YES in step S1213), the print job delivery program 530 returns the processing to step S1201. If not (NO in step S1213), in step S1214, the print job delivery program 530 transmits an end notification to the print job reception processing in FIG. 10. Then, in step S1215, the print job delivery program 530 ends the print processing.

The present invention may be realized by executing the following processing. More specifically, the present invention may be realized by supplying software (a program) for realizing the functions of the above exemplary embodiment to a system or an apparatus via a network or a storage medium of various types and causing a computer (CPU, or a micro processing unit (MPU)) of the system or the apparatus to read and execute the program.

According to each of the above exemplary embodiments, when a user holds an IC card over an authentication unit for the first time, the user can obtain a print product in accordance with a print setting. If the output device does not have a capacity suitable for the print setting, the user simply needs to hold the IC card over another authentication unit. If the user is flexible in accurately following the print setting and only needs to obtain a print product, the user simply needs to hold the IC card over the same authentication unit continuously. In this way, the user can properly obtain a desired print product with a few procedures in front of the output device. In addition, the host PC can execute most of the processing, low-function output devices also can be used. In other words, according to each of the above exemplary embodiments, the user can properly obtain a desired print product with a few procedures in front of the output device.

Aspects of the present invention can also be realized by a computer of a system or apparatus (or devices such as a CPU or MPU) that reads out and executes computer-executable instructions recorded on a computer-readable storage or memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-007423 filed Jan. 15, 2010, which is hereby incorporated by reference herein in its entirety.

What is claimed is:

1. An information processing apparatus, comprising:
   a print job output unit configured to output a print job,
   wherein, if the print job output unit receives a request for pull printing from an output device related apparatus for a first time, the print job output unit compares a capacity of an output target device with a print setting, selects a print job including a print setting matching with the capacity of the output target device from stored print jobs, and outputs the selected print job,
   wherein, if the print job output unit receives a request for pull printing from the output device related apparatus consecutively, the print job output unit outputs the stored print jobs,
   wherein, if a plurality of print jobs to be output exists, the print job output unit couples the plurality of print jobs, and
   wherein, if the plurality of print jobs to be output exists and the plurality of print jobs includes a print job including a print setting that prevents the print job from coupling, the print job output unit cancels coupling of the print job including the print setting that prevents the print job from coupling.

2. The information processing apparatus according to claim 1, wherein, if the print job output unit receives a request for pull printing from the output device related apparatus consecutively, the print job output unit outputs the stored print jobs without comparing the capacity of the output target device with the print setting.

3. A method for information processing executed by an information processing apparatus, the method comprising:
   comparing a capacity of an output target device with a print setting if a request for pull printing is received from an output device related apparatus for a first time and outputting a print job including a print setting matching with the capacity of the output target device from stored print jobs;
   outputting the stored print jobs if a request for pull printing is received from the output device related apparatus consecutively;
   coupling a plurality of print jobs if the plurality of print jobs to be output exists; and
   cancelling the coupling of a print job including a print setting that prevents the print job from coupling if the plurality of print jobs to be output exists and the plurality of print jobs includes the print job including the print setting that prevents the print job from coupling.

4. A non-transitory computer-readable storage medium storing computer-executable instructions which when executed by a computer cause the computer to perform the method comprising the steps of:
   comparing a capacity of an output target device with a print setting if a request for pull printing is received from an output device related apparatus for a first time and outputting a print job including a print setting matching with the capacity of the output target device from stored print jobs;
   outputting the stored print jobs if a request for pull printing is received from the output device related apparatus consecutively;
   coupling a plurality of print jobs if the plurality of print jobs to be output exists; and
   cancelling the coupling of a print job including a print setting that prevents the print job from coupling if the plurality of print jobs to be output exists and the plurality of print jobs includes the print job including the print setting that prevents the print job from coupling.

* * * * *